US007088550B2

(12) United States Patent
Gider et al.

(10) Patent No.: US 7,088,550 B2
(45) Date of Patent: Aug. 8, 2006

(54) MAGNETIC HARD DISK RECORDING HEAD WITH SELF-COMPENSATING THERMAL EXPANSION

(75) Inventors: Savas Gider, San Jose, CA (US); Wen-Chien David Hsiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 326 days.

(21) Appl. No.: 10/631,940

(22) Filed: Jul. 30, 2003

(65) Prior Publication Data

US 2005/0024957 A1 Feb. 3, 2005

(51) Int. Cl.
*G11B 5/147* (2006.01)
(52) U.S. Cl. .................................... 360/126
(58) Field of Classification Search .................. None
See application file for complete search history.

(56) References Cited

U.S. PATENT DOCUMENTS

| | | | | |
|---|---|---|---|---|
| 5,278,713 | A | | 1/1994 | Zucker ........................ 360/128 |
| 5,322,559 | A | | 6/1994 | Sleight ........................ 106/401 |
| 5,514,360 | A | | 5/1996 | Sleight et al. .............. 423/593 |
| 5,609,948 | A | * | 3/1997 | David et al. ................ 428/216 |
| 5,851,660 | A | * | 12/1998 | Tohma et al. ............... 428/336 |
| 6,105,381 | A | | 8/2000 | Ghoshal ..................... 62/259.2 |
| 6,183,716 | B1 | | 2/2001 | Sleight et al. .............. 423/593 |
| 6,459,551 | B1 | * | 10/2002 | Hayakawa .................. 360/313 |
| 6,560,853 | B1 | * | 5/2003 | Santini ..................... 29/603.14 |
| 6,651,312 | B1 | * | 11/2003 | Sasaki ...................... 29/603.12 |
| 6,699,427 | B1 | * | 3/2004 | Huang et al. ............... 264/434 |
| 2003/0193756 | A1 | * | 10/2003 | Kudo et al. ................. 360/313 |
| 2004/0075944 | A1 | * | 4/2004 | Macken et al. ............. 360/126 |

FOREIGN PATENT DOCUMENTS

JP 9265617 A 10/1997

OTHER PUBLICATIONS

On the Thermal Behavior of giant Magnetoresistance Heads by B.K. Gupta, Kenneth Young, Sameera K. Chilamakuri and Aric K. Menon, vol. 123, Apr. 2001, Copyright 2001 by ASME.
Thermomechanical Head Performance, IEEE Transactions on Magnetics, vol. 38, No. 1, Jan. 2002.
Monolithic Enhancement or Compensation of Laser Temperature Characteristics, D.A. Cohen, b. Mason, J. Dolan, C. Burns and L.A. Coldren, Department of Electrical and Computer Engineering University of California, Santa Barbara, CA, Final Report 1999-2000 for MICRO Project 99-024.

(Continued)

*Primary Examiner*—Allen Cao
(74) *Attorney, Agent, or Firm*—Robert O. Guillot; Intellectual Property Law Offices

(57) ABSTRACT

A magnetic head for reading information from and writing information to a hard magnetic disk having reduced thermal protrusion at the air bearing surface. In some embodiments, a read-head portion of the magnetic head includes one or more read insulation layers, and a write-head portion of the magnetic head includes one or more write insulation layers. The magnetic head may optionally further include one or more insulation layers between the read-head portion and the write-head portion. One or more of these insulation layers includes a material with a negative thermal expansion characteristic, including but not limited to, carbon fiber, zirconium tungstate ($Zr W_2 O_8$), or hafnium tungstate ($Hf W_2 O_8$).

15 Claims, 3 Drawing Sheets

OTHER PUBLICATIONS

Compressibility, Phase Transitions, and Oxygen Migration in Zirconium Tungstate, $ZrW_2O_8$, J.S.O. Evans, Z. Hu, J.D. Jorgensen, D.N. Argyriou, S. Short, A.W. Sleight, Science, Vo. 275, Jan. 3, 1997.

Negative Thermal Expansion from 0.3 to 1050 Kelvin in $ZrW_2O_8$, T.A. Mary, J.S.O. Evans, T. Vogt, A.W. Sleight, Science, vol. 272, Apr. 5, 1996.

* cited by examiner

MAGNETIC HARD DISK RECORDING HEAD WITH SELF-COMPENSATING THERMAL EXPANSION

FIELD OF THE INVENTION

The invention relates generally to magnetic heads for hard disk drives, and more particularly to magnetic heads with reduced thermal protrusion at the air bearing surface.

BACKGROUND

An important goal of the hard disk drive industry is to develop magnetic heads with continued increases in disk drive capacity and performance, and continued decreases in the cost of disk drives. Improvements in magnetic heads are sought that provide ever faster data writing speeds, and that allow data to be written with ever increasing data density, that is, with more data stored per unit of disk area.

Typically while a disk drive is operating, the magnetic head is separated from the surface of the disk by a small gap, which is termed the air bearing gap. The air bearing gap is maintained by a slider and a suspension system. The slider includes the magnetic head and an air bearing surface (ABS) that is shaped such that the rotation of the disk past the slider creates an aerodynamic force that tends to push the slider away from the disk. At the same time, the slider is pushed towards the disk by the suspension. The net effect is to maintain a generally uniform distance between the disk and the air bearing surface.

The size of the air bearing gap, also known as the air bearing fly height, is a key parameter of the disk drive. Smaller air bearing gaps allow magnetic heads to have faster writing speeds and higher data density. On the other hand when the gap becomes too small, it becomes too likely that the magnetic head may come into contact with the disk surface, which can permanently damage the magnetic head, the disk surface, or both.

A known problem with magnetic heads is that heat causes uneven thermal expansion of components within the head, thus distorting the air bearing surface of the head. The distortion takes the form of a protrusion of part of the magnetic head into the air bearing gap, where the size of the protrusion can be on the order of 20% of the height of the air bearing gap. The protrusion can contribute to unwanted contact of the magnetic head with the surface of the disk, which can damage the head, the disk, or both.

SUMMARY OF THE INVENTION

The invention seeks to reduce the protrusion that results from thermal expansion of the magnetic head during its operation.

In some embodiments, the invention provides a magnetic head for reading and writing a hard magnetic disk. A read-head portion of the magnetic head includes one or more read-head insulation layers, and a write-head portion of the magnetic head includes one or more write-head insulation layers. The magnetic head may optionally further include one or more insulation layers between the read-head portion and the write-head portion. One or more of these insulation layers includes a material having a negative thermal expansion characteristic.

Suitable materials include, but are not limited to: carbon fiber; carbon fiber in an epoxy matrix; carbon fiber in a photoresist matrix; zirconium tungstate ($Zr\,W_2\,O_8$); zirconium tungstate in an epoxy matrix; zirconium tungstate in a photoresist matrix, hafnium tungstate ($Hf\,W_2\,O_8$), hafnium tungstate in an epoxy matrix, or hafnium tungstate in a photoresist matrix.

BRIEF DESCRIPTION OF THE DRAWING

Objects, features and advantages of the invention will become apparent from the descriptions and discussions herein, when read in conjunction with the drawing. Technologies related to the invention, example embodiments of the invention, and example uses of the invention are illustrated in the various figures of the drawing. The drawings are generally not drawn to scale such that the relative sizes of the elements shown may be distorted to clarify features of the invention, thus the shapes shown for the elements may vary substantially from their actual shapes.

DETAILED DESCRIPTION OF THE PREFERRED EMBODIMENTS

The descriptions, discussions and figures herein illustrate technologies related to the invention, show examples of the invention, and give examples of using the invention. Known methods, procedures, systems, circuits, or elements may be illustrated and described without giving details so as to avoid obscuring the principles of the invention. On the other hand, details of specific embodiments of the invention are presented, even though such details may not apply to other embodiments of the invention.

Figure 1:
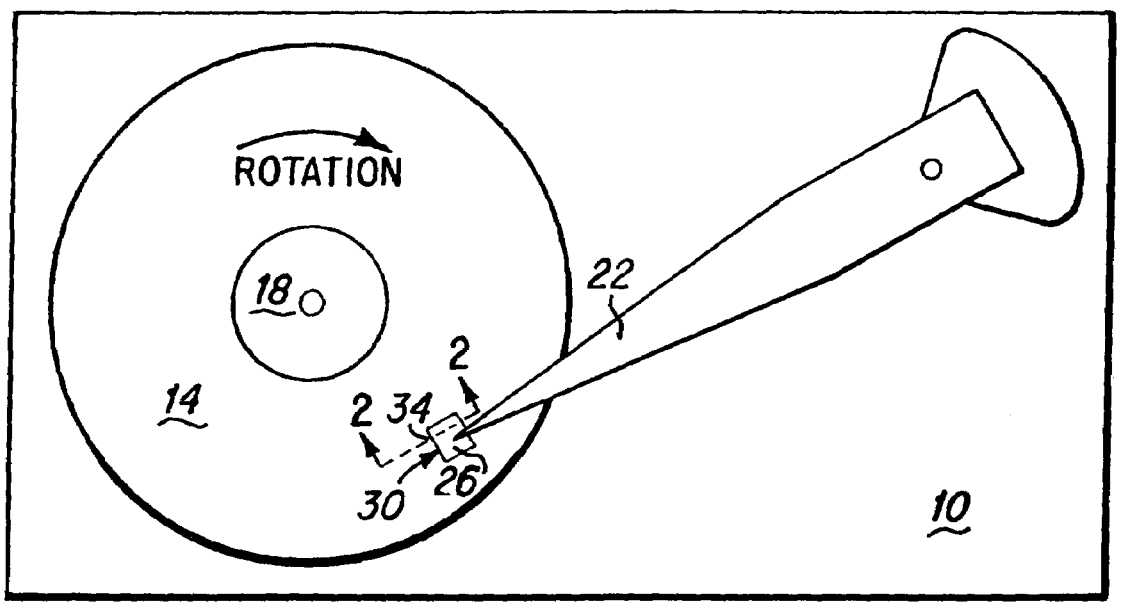
FIG. 1 is a top view of a disk drive that includes a magnetic head according to an embodiment of the invention.

FIG. 1 is a top plan view that depicts significant components of a hard disk drive 10 according to an embodiment of the invention. The hard disk drive 10 includes a magnetic media hard disk 14 that is rotatably mounted upon a motorized spindle 18. An actuator arm 22 is pivotally mounted within the hard disk drive 10. A slider 26 is mounted upon the distal end of the actuator arm 22. The slider 26 has a trailing surface 30 that includes a magnetic head 34 according to an embodiment of the invention. A typical hard disk drive 10 may include a plurality of disks 14 that are rotatably mounted upon the spindle 18 and a corresponding plurality of the actuator arms 22, the sliders 26, and the magnetic heads 34. As is known to those skilled in the art, when the hard disk drive 10 is operated, the hard disk 14 rotates upon the spindle 18 and the slider 26 glides above the surface of the hard disk 14.

Figure 2:
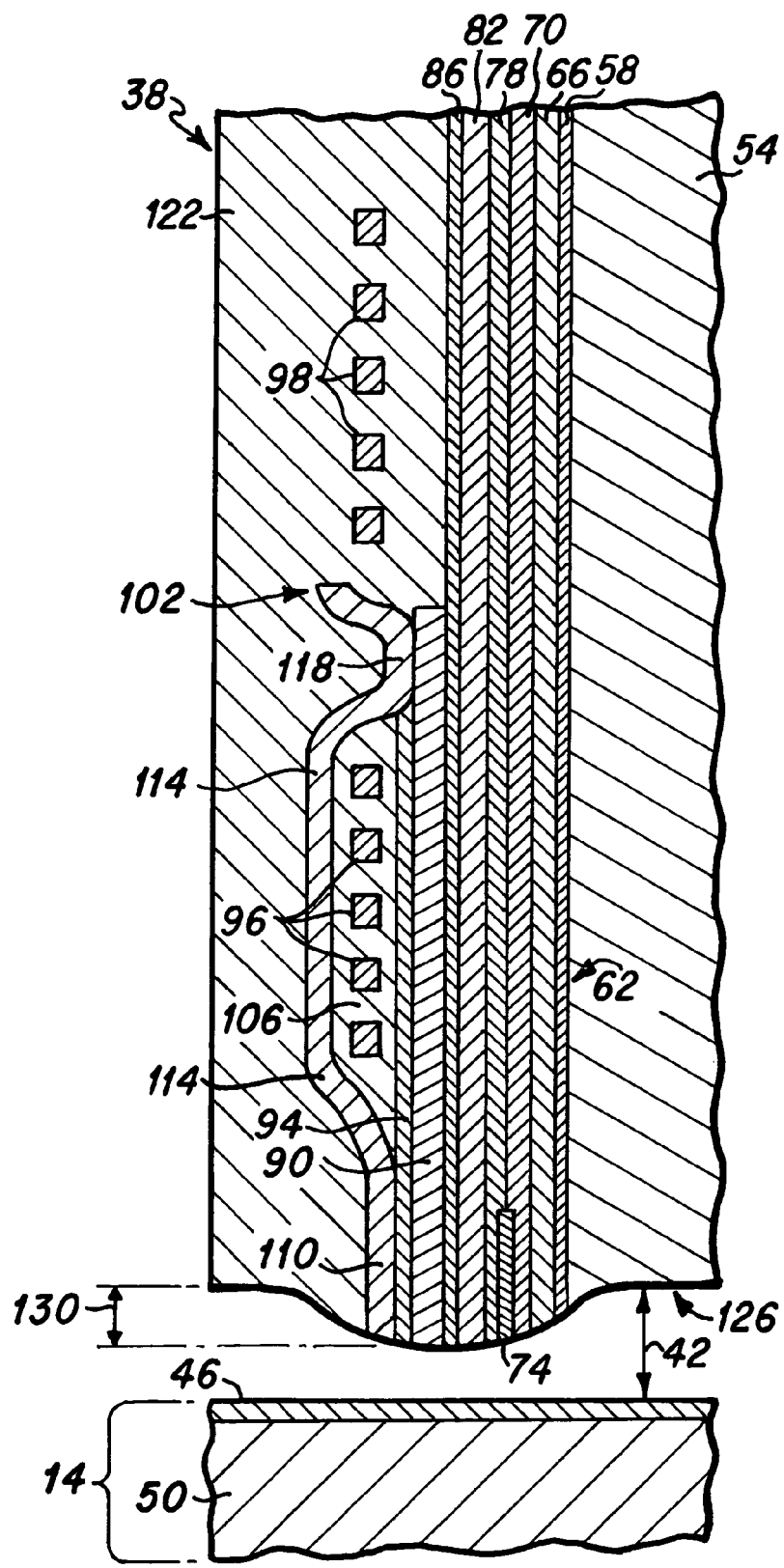
FIG. 2 is a cross sectional view of a prior art magnetic head.

FIG. 2 is a side cross-sectional view taken along line 2—2, of FIG. 1 illustrating a magnetic head 38 according to the prior art, the hard disk 14, and an air bearing gap 42 between the head 38 and the hard disk 14. As is well known, the hard disk 14 includes a layer 46 of a ferromagnetic material that is layered onto a disk substrate 50.

The prior art magnetic head 38 includes: a head substrate 54; and an undercoat layer 58 that is deposited upon a surface 62 of the head substrate 54 when the head substrate 54 is form of a wafer and the surface 62 is the upper surface of the wafer. The prior art magnetic head 38 further includes a read head portion that includes: a first read head magnetic shield (S1) layer 66 that is fabricated upon the undercoat layer 58; a first (I1) insulation layer 70 that is fabricated upon the S1 shield 66; a read head element 74 that is fabricated upon insulation layer 70; a second (I2) insulation layer 78 that is fabricated upon the read head 74 and the I1 insulation layer 70; and a second magnetic shield (S2) layer 82 that is fabricated upon the I2 insulation layer 78. A further insulation layer 86 is deposited upon the S2 shield 82 and serves to insulate the read-head and the write-head portions of magnetic head 38.

Figure 4:
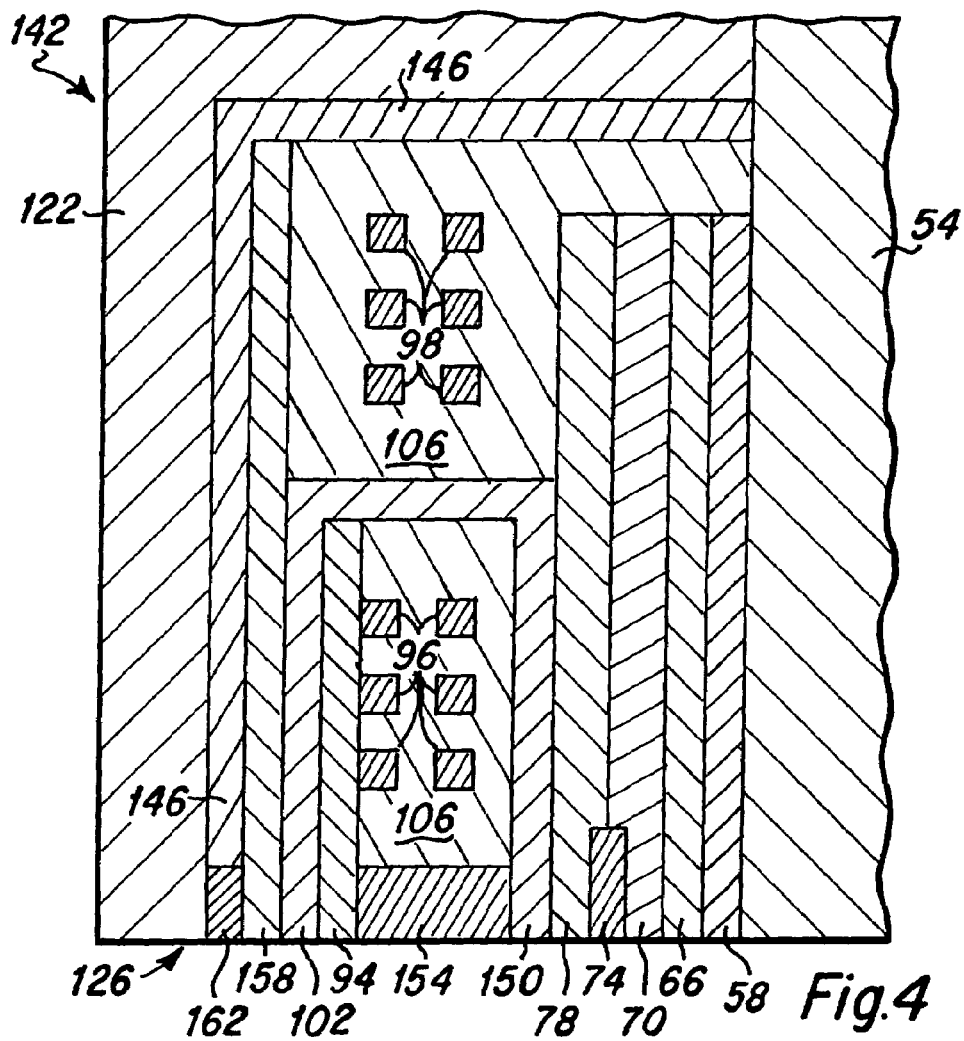
FIG. 4 is a cross sectional view of magnetic head according to another embodiment of the invention, in which the protrusion of the head has been reduced both by using negative thermal expansion materials and by adding a heat sink layer to the head.

Magnetic head 38 further includes the write head portion, which includes a first magnetic pole (P1) layer 90 that is fabricated upon the insulation layer 86. As is well known to those skilled in the art, in a type of magnetic head termed a merged head, the P1 pole layer 90 and the S2 shield layer 82 are merged into a single layer that performs the functions of the S2 shield 82 when the magnetic head is reading data from a hard disk, and performs the function of the P1 pole layer 90 when the magnetic head is writing data to a hard disk. The insulation layer 86 is not present in such a merged head. The invention, as is discussed below in detail, may be embodied in a standard magnetic head, as depicted in FIG. 2, or as a merged magnetic head, as depicted in FIG. 4.

The write-head portion of the prior art magnetic head 38 further includes: a patterned write gap layer 94 that is fabricated upon the P1 pole 90; a spiral, planar induction coil that includes a plurality of inner turns 96 and a plurality of outer turns 98; and a second magnetic pole (P2) 102. The second magnetic pole 102 includes: a second magnetic pole tip portion 110; a yoke portion 114; and a back gap piece 118. The inner induction coil turns 96 are disposed above the P1 pole 90 and below the P2 yolk portion '114, and are formed with coil insulation 106 between the turns. Following the fabrication of the induction coil, the second magnetic pole (P2) 102 is fabricated above the inner induction coil turns 96. The P2 pole 102 is magnetically connected with the P1 pole 90 through the back gap piece 118. Following further fabrication steps as are known to those skilled in the art, an overcoat layer 122 is deposited across the surface of the head-substrate wafer, and the wafer is thereafter sliced into the individual magnetic heads 38. The magnetic heads are later fabricated to include a polished air bearing surface (ABS) 126, as is well known by those skilled in the art.

Following its fabrication, the magnetic head is installed on the actuator arm 22 of a hard disk drive 10 proximate to the surface of a hard disk, as is depicted in FIG. 2. Significantly, due to thermal expansion of head layers and components during normal operating conditions, the air bearing surface 126 will develop a substantial protrusion 130 of head material into the air bearing gap. Thus, a magnetic head that is designed to operate with the air bearing gap 42 of a particular size may in fact have a much smaller gap during usage. The protrusion 130 is caused by heat, including: heat generated within the magnetic head during the operation of the disk drive; heat generated elsewhere within the disk drive; and ambient heat external to the disk drive. This heat acts unevenly on the various materials used in fabricating magnetic head 38. Materials typically used in magnetic heads and sliders include alumina ($Al_2O_3$), which has a coefficient of thermal expansion (CTE) per degree Kelvin of approximately $7 \times 10^{-6}/°$ K, and copper, which has a CTE of approximately $2 \times 10^{-5}/°$ K.

The protrusion of a disk drive can be analyzed in two categories: static protrusion and dynamic protrusion. Static protrusion refers to the protrusion due to the temperature internal to an operating disk drive being higher than the temperature at which the magnetic head was designed to operate. Dynamic protrusion refers to the protrusion caused by heat generated in the magnetic head during the writing process. Such heat includes both Joule heating that occurs within induction coil turns 96 and 98, and eddy current heating that occurs within magnetic poles 90 and 102. Modern disk drives operate with air bearing gaps in the range of 10 nanometers (nm), and continued improvements in magnetic heads result in continued reductions of the air bearing gap 42. At a gap size of 10 nm the thermal expansion of the magnetic head may be substantial, for example, a prior-art magnetic head may protrude by about 2 nm, which is approximately 20% of the air bearing gap 42.

Figure 3:
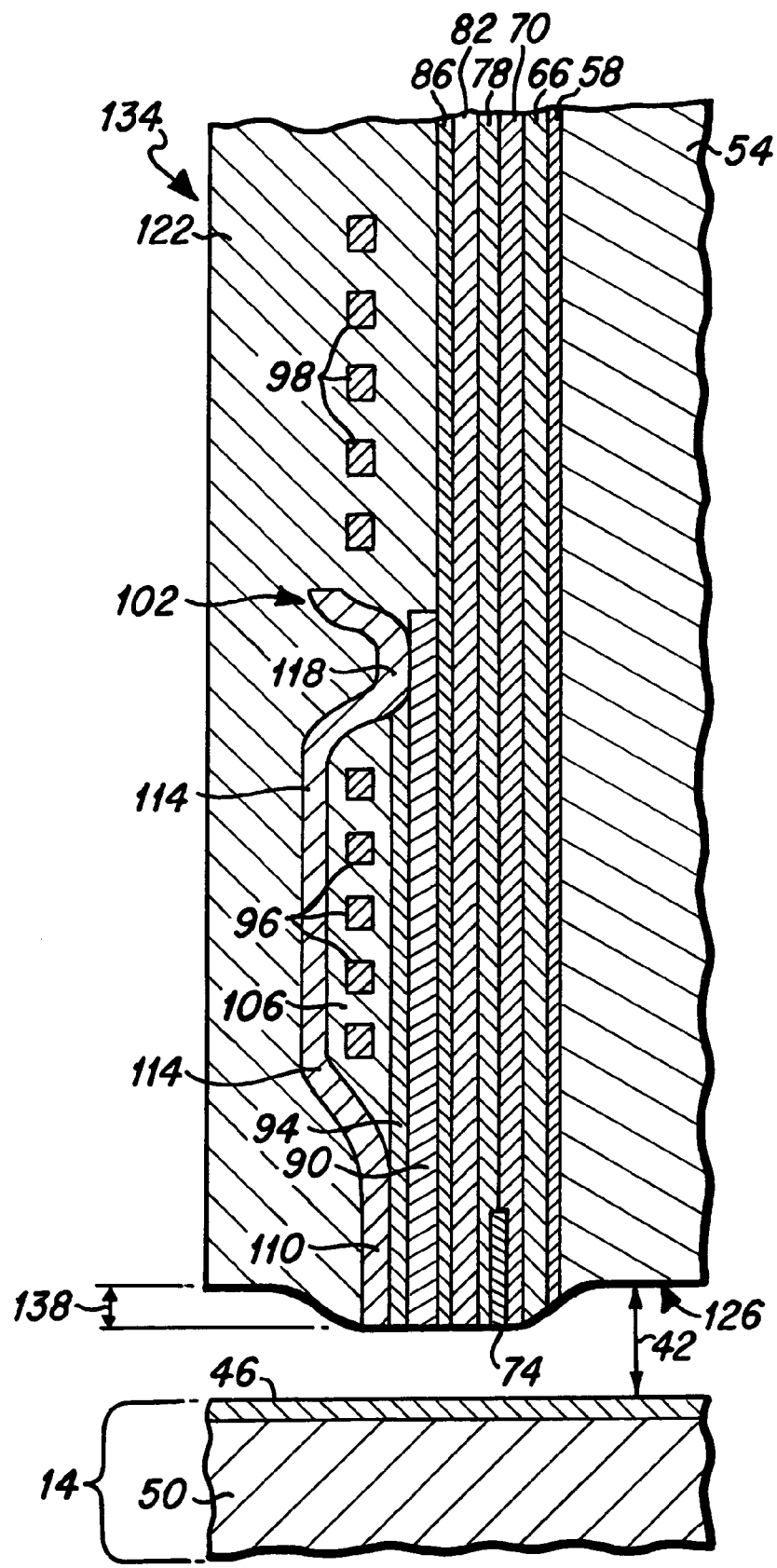
FIG. 3 is a cross sectional view of magnetic head according to an embodiment of the invention, in which the protrusion of the head has been reduced by including in the head materials with a negative thermal expansion characteristic.

FIG. 3 is a cross-sectional view taken along cut line 2—2 of FIG. 1 that illustrates a magnetic head 134 according to an embodiment of the invention. Except as described below, the layers and components within magnetic head 134 are equivalent in form, composition and alternatives to the correspondingly numbered layers and components within magnetic head 38 of FIG. 2.

To reduce the unwanted thermal expansion and protrusion of the magnetic head, one or more of the insulation layers of magnetic head 134 are formed from a material having a negative thermal expansion characteristic such that the material will shrink in size when heated. These layers may include: the first insulation layer 70; the second insulation layer 78; the insulation layer 86 between the read-head portion and the write-head portion of the magnetic head; the write gap layer 94; the coil insulation 106; or the overcoat layer 112. Any of, any combination or two or more of, or all of the insulation layers used may contain the material with the negative thermal expansion characteristic.

As can be seen by comparing FIGS. 2 and 3, the protrusion 138 of magnetic head 134 according to an embodiment of the invention is reduced, as compared to the protrusion 130 of the magnetic head 38, because the magnetic head 134 contains materials that become smaller as they are heated. As is known to those skilled in the art, thermal expansion of materials, and of structures composed of conjoined elements formed from various materials, can be modeled by computer simulation.

Results of such a simulation performed by the inventors indicate that the static thermal protrusion of a magnetic head can be reduced by approximately 50% and the dynamic thermal protrusion can be reduced by about 10% by changing only the composition of the overcoat layer 122. In this simulation, the overcoat layer 122 was 10 microns (μm) thick and was made from a hypothetical material with a net thermal expansion of zero. All other insulation layers in this simulation were made from alumina, including the undercoat insulation layer 58 which had a thickness of 1.6 μm. The S1 shield layer 66, the S2 shield layer 82, and the P1 pole layer 90 were 2 μm thick and were made from 80% nickel (Ni) and 20% iron (Fe). The pole pedestal 154 was 2.7 μm thick and was also made from 20% nickel and 80% iron. The P2 pole layer 90 included both a pole tip segment near the air bearing surface 42 and a yoke segment that was joined to the pole tip segment. The pole tip segment was 1.4 μm thick and was made from 20% nickel and 80% iron. The yoke segment was 1.7 μm thick and was made from 45% nickel and 55% iron.

Materials with a negative thermal expansion characteristic are known in the art; see for example, U.S. Pat. No.

5,514,360, issued to Arthur W. Sleight. Materials suitable for use in various embodiments of the invention include, but are not limited to, zirconium tungstate ($Zr\ W_2\ O_8$), hafnium tungstate ($Hf\ W_2\ O_8$), or carbon fibers. Zirconium tungstate may be preferred in some embodiments of the invention because its coefficient of thermal expansion (CTE) per degree Kelvin is approximately $-8.8 \times 10^{-6}/^\circ$ K, which is comparable in absolute magnitude to that of alumina, and because its thermal contraction is isotropic, that is, it occurs equally in all directions. In contrast, carbon fibers have a lower CTE of approximately $-1 \times 10^{-6}/^\circ$ K, and the negative thermal expansion characteristic only applies along the axis of the fiber.

Embodiments of the invention may use various forms of materials with a negative thermal expansion characteristic, and the materials used may be fabricated into magnetic heads according to various techniques. Suitable techniques include, but are not limited to: a technique of powdering the material, then including the powder within a matrix of epoxy, and then using known techniques for coating a wafer with an epoxy layer; a technique of powdering the material, then including the powder within a matrix of photoresist, and then using known techniques for coating a wafer with a photoresist layer; and a technique of sputtering the material onto a wafer.

FIG. 4 is a schematic view of a cross sectional view of a magnetic head 142 according to a further embodiment of the invention. Except as described below, the layers and components within magnetic head 142 are equivalent in form, composition and alternatives to the correspondingly numbered layers and components within magnetic head 38 of FIG. 2 and magnetic head 134 of FIG. 3.

In order to further reduce the unwanted thermal expansion of the magnetic head 142, a heat transfer layer 146 may additionally be fabricated within the head. The protrusion in a magnetic head that uses only negative thermal expansion materials without the use of the heat transfer layer 142, because the temperature buildup within the head is reduced by the heat transfer layer. Such heat transfer layers are described in detail in U.S. patent application Ser. No. 10/215,230, entitled "Heat Sink for a Magnetic Recording Head," by Savas Gider et al, which is assigned to the assignee of this application and incorporated herein as though set forth in full. The incorporated patent application discloses heat transfer layers, heat sinks and the like, any or all of which may be incorporated into various embodiments of the invention.

Unlike magnetic heads 38 and 134 (as shown in FIGS. 2 and 3), the magnetic head 142 is a merged head having a two-layer induction coil. Merged magnetic heads, as described with regard to FIG. 2 above, do not contain as separate elements the S2 shield 82, the P1 pole 90 and the insulation layer 86. Rather, a merged ferromagnetic layer 150 is fabricated upon the upper insulation layer 78. The merged layer 150 of magnetic head 142 performs the functions of the shield 82 and of the P1 pole 90.

Also, unlike magnetic heads 38 and 134, the magnetic head 142 has a two-layer induction coil, in which two layers of inner turns 96 are formed after the merged layer 150 and before the P2 pole 102. A dual-layer magnetic head, such as head 142, may also include a pole pedestal 154 that is composed of a ferromagnetic material, and is formed upon the merged layer 150 at the air bearing surface 126. The pole pedestal 154 extends the magnetic pole, thus allowing additional room for two layers of the inner induction coil turns 96 to be fabricated after the merged layer '150 and before the second magnetic pole layer '102. Various embodiments of the invention use induction coils with various numbers of layers of turns, and may use or omit the pole pedestals 154.

In the magnetic head 142, an insulation layer 158 is fabricated upon the P2 pole layer 102, and then the heat transfer layer 146 is fabricated upon the insulation layer 158. The heat transfer layer 146 is fabricated with an end 160 that is formed near air bearing surface 126, and it extends from the end 160 around the write-head portion and the read-head portion of magnetic head 142 to the head substrate 54; thus, layer 146 thermally couples and transfers heat from the magnetic head 142 to the head substrate 54. An insulation portion 162 of the heat transfer layer 146 is formed at the air bearing surface 126. The insulation portion 162 may be formed from a material having a negative thermal expansion characteristic, in which case it helps counteract the thermal expansion of the heat transfer layer 146. The heat transfer layer 146 is preferably but not necessarily formed from a material with very high thermal conductivity, such as copper. When copper is used, the insulation portion 162 serves to prevent exposing copper to the air bearing surface, where it may create corrosion problems.

Various embodiments of the invention can include heat transfer layers that are formed in one or more of various locations within or near the magnetic head. Such locations include, but are not limited to: between the read-head portion and the write-head portion of the magnetic head; between two or more layers of coil turns 96 or 98; or as shown in magnetic head 142, between the second magnetic pole layer 102 and the overcoat layer 122. Some embodiments of the invention can include a heat transfer layer or layers that transfer heat away from air bearing surface 126 without transferring the heat to any particular element or location. In other embodiments, the heat transfer layer or layers are thermally coupled to various elements within the magnetic head or the slider, including but not limited to: a heat sink on a surface of the slider other than the air bearing surface; or head substrate 54. Further embodiments of the invention may include various insulation layers that are composed of a negative thermal expansion characteristic material, including but not limited to those shown in any of FIGS. 2, 3, or 4.

The scope of the invention is set forth by the following claims and their legal equivalents. The invention is subject to numerous modifications, variations, selections among alternatives, changes in form, and improvements, in light of the teachings herein, the techniques known to those skilled in the art, and advances in the art yet to be made. The figures and descriptions herein are intended to illustrate the invention by presenting specific details; they are not intended to be exhaustive or to limit the invention to the designs, forms and embodiments disclosed.

We claim:

1. A magnetic head comprising:
   a read-head portion that includes one or more read insulation layers;
   a write-head portion that includes one or more write insulation layers; and
   wherein at least one insulation layer selected from one of the read insulation layers, or one of the write insulation layers, includes a material having a negative thermal expansion characteristic; and
   wherein the negative thermal expansion material is selected from the group consisting of carbon fiber, carbon fiber in an epoxy matrix, carbon fiber in a photoresist matrix, zirconium tungsten in an epoxy matrix, zirconium tungsten in a photoresist matrix, hafnium tungsten in an epoxy matrix, and hafnium tungsten in a photoresist matrix.

2. The magnetic head of claim 1, wherein the insulation layer that includes the negative thermal expansion material is selected from one or more of an undercoat insulation layer disposed between the read-head portion and a substrate, a first insulation layer within the read-head portion, a second insulation layer within the read-head portion, a write gap layer within the write-head portion, a coil insulation layer within the write-head portion, or an overcoat insulation layer.

3. The magnetic head of claim 1, wherein the write-head portion further includes at least two layers of induction coil turns and at least one coil insulation layer disposed between the induction coil layers.

4. The magnetic head of claim 1, further including a heat transfer layer.

5. A magnetic head comprising:
    means for writing information to a magnetic medium, the writing means including write-head electromagnetic components:
    means for reading information from the magnetic medium, the reading means including read-head electromagnetic components; and
    means for insulating the electromagnetic components, where at least a portion of the insulating means is also means for reducing the thermal expansion of the magnetic head; and
    wherein the means for reducing the thermal expansion of the magnetic head includes a negative thermal expansion material that is selected from the group consisting of carbon fiber, carbon fiber in an epoxy matrix, carbon fiber in a photoresist matrix, zirconium tungsten in an epoxy matrix, zirconium tungsten in a photoresist matrix, hafnium tungsten in an epoxy matrix, and hafnium tungsten in a photoresist matrix.

6. The magnetic head of claim 5, wherein the writing means further includes at least two layers of means for inducing a magnetic field, where the two layers are separated by means for insulating the inducing means that is also means for reducing the thermal expansion of the magnetic head.

7. The magnetic head of claim 5, further comprising: an air bearing surface that includes a surface of the writing means and a surface of the reading means; and means for transferring heat away from the air bearing surface.

8. A disk drive for reading and writing information in a magnetic medium, the disk drive comprising:
    a disk having a surface that includes the magnetic medium;
    a motor coupled to rotate the disk;
    a slider having an air bearing surface;
    an actuator configured to hold the air bearing surface of the slider proximate to surface of the disk;
    a magnetic head disposed within the slider and forming part of the air bearing surface, wherein the magnetic head includes:
    i) a read-head portion that includes one or more read insulation layers;
    ii) a write-head portion that includes one or more write insulation layers; and
    wherein at least one insulation layer selected from one of the read insulation layers or one of the write insulation layers, includes a material having a negative thermal expansion characteristic; and
    wherein the negative thermal expansion material is selected from the group consisting of carbon fiber, carbon fiber in an epoxy matrix, carbon fiber in a photoresist matrix, zirconium tungsten in an epoxy matrix, zirconium tungsten in a photoresist matrix, hafnium tungsten in an epoxy matrix, and hafnium tungsten in a photoresist matrix.

9. The disk drive of claim 8, wherein the insulation layer that includes the negative thermal expansion material is selected from one or more of an undercoat insulation layer disposed between the read-head portion and a substrate, a first insulation layer within the read-head portion, a second insulation layer within the read-head portion, a write gap layer within the write-head portion, a coil insulation layer within the write-head portion, or an overcoat insulation layer.

10. The disk drive of claim 8, wherein the write-head portion further includes at least two layers of induction coil turns and at least one coil insulation layer disposed between the induction coil layers.

11. The disk drive of claim 8, wherein the magnetic head further includes a heat transfer layer.

12. The disk drive of claim 11, wherein the slider is further configured to dissipate heat and is thermally coupled to the heat transfer layer.

13. A disk drive for reading and writing information within a magnetic medium, the disk drive comprising:
    means for holding the information in a magnetic form;
    means for rotating the holding means;
    a slider having an air bearing surface; and
    means for positioning the air bearing surface of the slider proximate to the holding means;
    wherein the slider farther includes a magnetic head including:
    i) means for writing the information into the holding means, the writing means including write electromagnetic components;
    ii) means for reading the information from the holding means, the reading means including read electromagnetic components; and
    ii) means for insulating the read electromagnetic components and the write electromagnetic components, wherein at least a portion of the insulating means is also means for reducing the thermal protrusion of the magnetic head into the air bearing surface; and
    wherein the means for reducing the thermal protrusion of the magnetic head includes a negative thermal expansion material that is selected from the group consisting of carbon fiber, carbon fiber in an epoxy matrix, carbon fiber in a photoresist matrix, zirconium tungsten in an epoxy matrix, zirconium tungsten in a photoresist matrix, hafnium tungsten in an epoxy matrix, and hafnium tungsten in a photoresist matrix.

14. The disk drive of claim 13, wherein the writing means further includes at least two layers of means for inducing a magnetic field, where the two layers are separated by means for insulating the inducing means that is also means for reducing the thermal protrusion.

15. The disk drive of claim 13, further comprising means for transferring heat away from the air bearing surface.

* * * * *